United States Patent [19]

Janes

[11] 3,993,878
[45] Nov. 23, 1976

[54] ANTI-REVERSE MEANS FOR CENTRAL DICTATION EQUIPMENT

[75] Inventor: Allan Janes, Toronto, Canada

[73] Assignee: Allan Janes, Toronto, Canada

[22] Filed: Mar. 20, 1975

[21] Appl. No.: 560,385

[52] U.S. Cl. .......................... 179/100.1 DR; 179/6 E
[51] Int. Cl.² .................... G11B 15/20; G11B 27/10
[58] Field of Search .................... 179/100.1 DR, 6 E

[56] References Cited
UNITED STATES PATENTS

| 2,800,531 | 7/1957 | Kobler | 179/6 E |
| 3,197,562 | 7/1965 | Happold et al. | 179/160.1 DR |
| 3,242,268 | 3/1966 | Wolfner | 179/100.1 DR |
| 3,470,777 | 10/1969 | Flubacker | 179/100.1 DR |

FOREIGN PATENTS OR APPLICATIONS

| 914,064 | 12/1962 | United Kingdom | 179/100.1 DR |

Primary Examiner—Raymond F. Cardillo, Jr.

[57] ABSTRACT

An anti-reverse mechanism for a central dictation record-playback machine comprises an anti-reverse solenoid, a normally open contact, mechanism for activating the anti-reverse solenoid and a device connected to the contact which precludes backspacing of a recording tape relative to a record-playback head of a central dictation record-playback machine when the contact is closed. The anti-reverse solenoid has a movable arm which is connected to a plate on which a record medium index is slidably mounted and driven along the plate by a worm gear. The plate is adapted to pivot about its longitudinal axis to disengage the index from the worm gear. Upon such disengagement, the index returns to its start position on the plate to close the contact whereby backspacing into previously recorded messages on the dictation machine is precluded.

10 Claims, 4 Drawing Figures

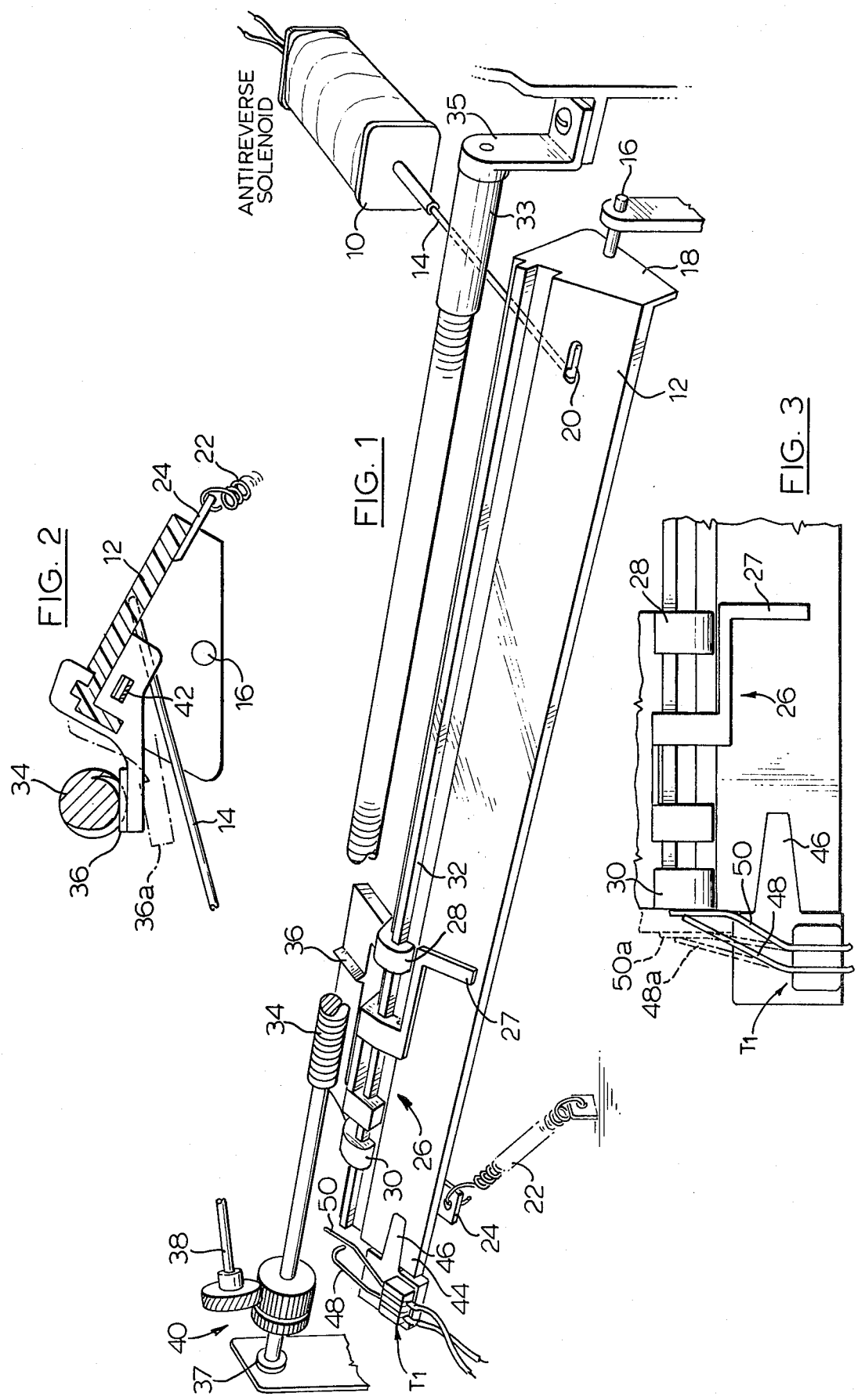

ANTI-REVERSE MEANS FOR CENTRAL DICTATION EQUIPMENT

FIELD OF THE INVENTION

This invention relates to central dictation record-playback machines for recording dictated messages transmitted from a remote station, such machines being provided with an anti-reverse means for precluding backspacing into and playing back previously recorded messages on the central dictation machine.

BACKGROUND OF THE INVENTION

In a central dictation recording system, a record-playback machine may record messages dictated from several remote stations by several different individuals. Privacy of dictated messages if of primé consideration so that after a message is recorded on the central dictation record-playback machine, it is important to ensure that the next individual dictating a message on the same machine is not able to backspace into the previously recorded messages. It is also important to preclude such backspacing because the accidental backspacing into a previously recorded message and then the beginning of the recording of a new message can result in the erasure of the portion of the previously recorded message into which the backspacing occurred.

Backspacing into previously recorded messages may be prevented by methods such as providing a tone burst at the end of the dictated message where the backspacing means is precluded from backspacing the recording tape beyond the tone burst location on the recording tape. Other methods may involve mechanisms which prevent backspacing into pre-recorded messages, however, such mechanisms are usually very complicated in structure and quite costly.

It is therefore an object of the invention to provide an efficient mechanically activated anti-reverse means which precludes backspacing into previously recorded messages on a central dictation recording system.

It is another object of the invention to provide an anti-reverse means which is adapted for use on a central dictation recording machine which has a record medium index which is adapted to return to its start position when dictation of a message from a remote station is completed.

It is a further object of the invention to provide an anti-reverse means which is controlled from a remote station such as a telephone.

It is yet another object of the invention to provide a simple electrical circuit which is used in conjunction with the PBX system of the Bell Telephone to control the anti-reverse means.

It is another object of the invention to provide a normally open switch which controls the backspacing means which when contacted by the record medium index as it returns to its start position, closes the switch until the record medium index has moved far enough away from its start position during subsequent recording of the message that backspacing is only permitted to the beginning of the message being presently recorded.

SUMMARY OF THE INVENTION

The anti-reverse means according to this invention is used in a central dictation record-playback machine for recording dictated messages transmitted from a remote station. The central dictation record-playback machine has a record medium index which is adapted to return to its start position while the position of the record-playback head remains stationary relative to the recording tape of the central dictation record-playback machine when dictation of each message from a remote station is completed. The machine also has means for backspacing the recording tape relative to the record-playback head. The anti-reverse means for precluding backspacing into and playing back previously recorded messages on the central dictation record-playback machine comprises means for returning the record medium index to its start position upon commond from a remote station when dictation of a message from a remote station is completed. A normally open contact which is closed when the record medium index is returned to its start position is also provided. The contact is so connected to the means for backspacing that activation of such means is precluded as long as the record medium index is in its start position. The means for backspacing the recording tape relative to the record-playback head is capable of activation upon command from a remote station when the contact is opened. The record medium index is moved from its start position during subsequent dictation of a message from a remote station and with such movement, opening of the contact results so that backspacing into and playing back of the message being presently recorded is permitted.

The electrical circuitry which may be used to activate the means for precluding backspacing may be solid state or non-solid state, depending upon design requirements. The electrical system may also be designed to cooperate with a dial dictation trunk system of the PBX system of the Bell Telephone so that the telephone acts as a remote station in transmitting dictation to the central dictation record-playback machine.

BRIEF DESCRIPTION OF THE DRAWINGS

These and other objects, advantages and features of the invention will become apparent in the detailed description of the preferred embodiments of the invention which are shown in the drawings wherein:

FIG. 1 is a perspective view showing the anti-reverse mechanism according to a preferred embodiment of the invention which precludes backspacing into previously recorded messages;

FIG. 2 is a section along lines 2—2 of FIG. 1 showing two positions of the record medium index as it engages and disengages the worm gear;

FIG. 3 is an enlarged view showing the record medium index closing a normally open switch.

DETAILED DESCRIPTION OF THE PREFERRED EMBODIMENTS

Figure 4:
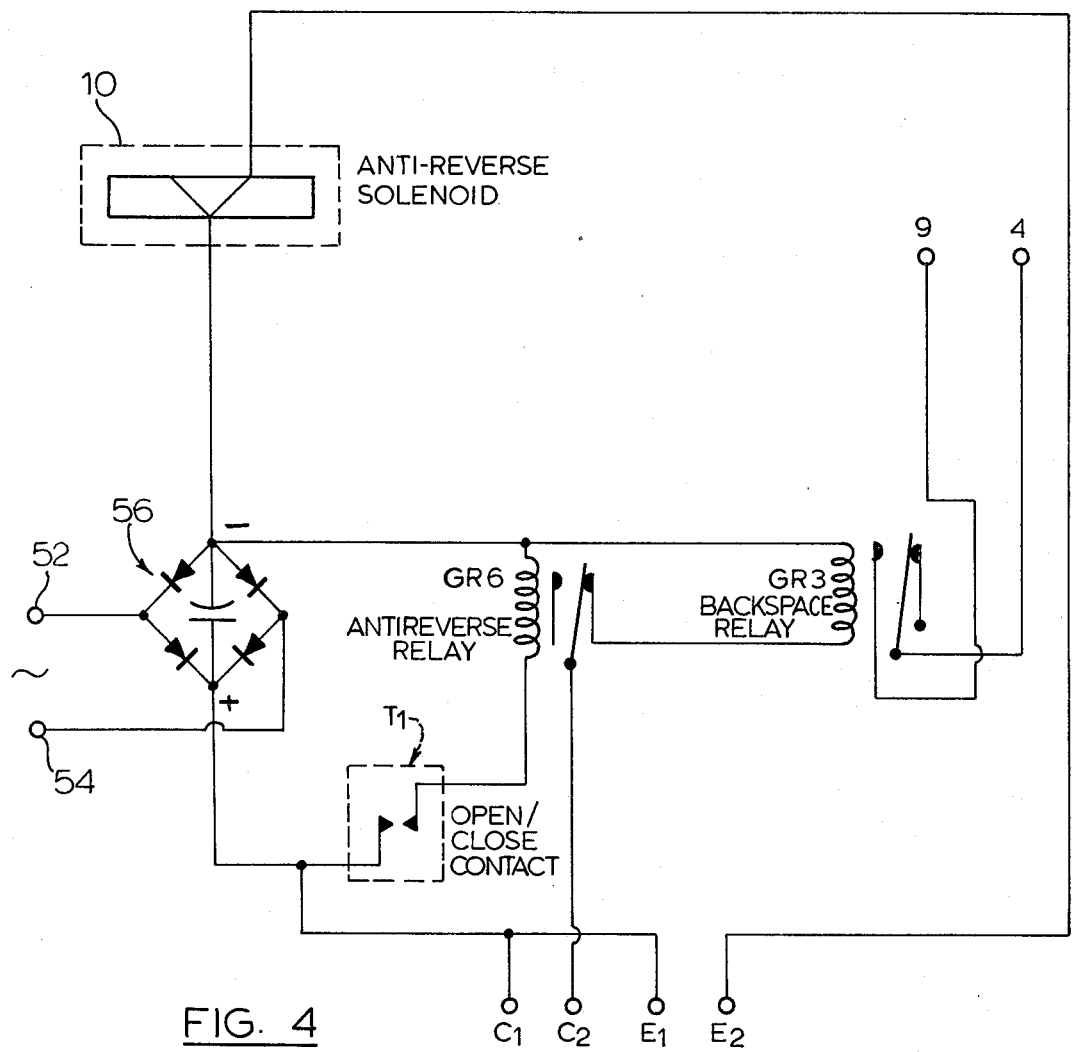
FIG. 4 is a circuit diagram of the circuitry which may be used in controlling the anti-reverse means according to this invention.

A preferred embodiment of the anti-reverse means according to this invention is shown in the drawings. Referring to FIG. 1, the anti-reverse mechanism as it is shown is adapted for use on a DeJur Grundig Executive Stenorette central dictation record-playback machine. The mechanism comprises an anti-reverse solenoid 10 which is connected to a plate 12 by movable arm 14. The plate 12 is pivoted about pin 16 which extends through side wall 18 and along the underside of plate 12 to the other side thereof to ensure a uniform pivot of plate 12 about pin 16. Upon activation of the solenoid 10, the plate 12 is pivoted backwards into the face of the page. Arm 14 is connected to plate 12 in the manner shown in FIG. 1 where the bent portion 20 of arm 14 is secured to the face of the plate and is flush therewith. The bent portion 20 may be secured to the plate by an epoxy resin glue. A spring 22 is provided and connected at 24 to the plate to hold it in its normal position as shown in FIG. 1 of the drawings so that subsequent to activation of the anti-reverse solenoid 10, the plate 12 is returned to its normal position by means of spring 22. A record medium index 26 is adapted to slide along the length of plate 12 where the body portion of the record medium index has channeled lugs 28 and 30 which engage ridge 32 to enable the index to slide along the length of plate 12. An indicator 27 is provided on the record medium index to indicate the recording tape location relative to the record playback head in accordance with standard practice by use of a chart or the like on plate 12.

A worm gear 34 is mounted in bearing 33 which is supported by post 35. The other end of the worm gear 34 is journalled in bearing 37 to support the rotation of the worm gear 34. A worm gear engaging portion 36 of the record medium index 26 engages worm gear 34 to drive the index along the length of the plate 12. The worm gear 34 is driven by rotary-driven shaft 38 through gear means 40.

With reference to FIG. 2, activation of solenoid 10 causes arm 14 to be withdrawn to pivot plate 12 about pin 16 so that the worm gear engaging portion 36 is moved to the position 36a out of engagement with the worm gear 34. At 42 a coiled spring end is attached. As the record medium index 26 moves along plate 12, the coiled spring is paid out under tension. Upon activation of solenoid 10, and disengagement of the worm gear engaging portion 36, the coiled spring as it is attached to the index at 42 returns the index back to its start position on plate 12. It is understood that the worm gear 34 drives the index 26 along plate 12 in sequence with the movement of the recording tape past the record-playback head of the dictation recording machine. Whenever solenoid 10 is activated upon command from a remote station when dictation of a message is completed, the index 26 is returned to its start position which is at the extreme lefthand side 44 of plate 12 while the recording tape remains stationary relative to the record-playback head because activation of solenoid 10 does not activate any other function of the machine to rewind the recording tape. The backwards movement of the record medium index can therefore be effected independently of the recording tape. When the index 26 returns to its start position, lug 30 closes a normally open switch $T_1$. The switch consists of two resilient wires 48 and 50. Wire 50 is displaced to contact resilient wire 48 and constitute a closed switch. Both resilient wires 48 and 50 are further displaced subsequent to contact, to the left as shown by dotted lines 48a and 50a. Switch $T_1$ is secured to plate 12 by insert 46 and so positioned that when index 26 returns to its start position, lug 30 closes switch $T_1$.

Referring to FIG. 4, a preferred embodiment of the circuitry which controls the anti-reverse solenoid is shown. It is understood that although the circuitry shows the use of relays, solid state circuitry may also be used, such adaptation being obvious to those skilled in the art. It is also understood that although the switch $T_1$ as shown in the drawings is normally open, it is apparent that the circuitry of FIG. 4 may be altered to permit operation when switch $T_1$ is normally closed, by reversing the circuitry relating to the anti-reverse relay.

The anti-reverse means may be controlled upon command from a remote station. The remote station may be connected directly to the central dictation record-playback machine or indirectly through a Bell Telephone PBX system. At the remote station, means is provided to control the circuitry shown in FIG. 4. Contacts $C_1$, $C_2$ and $E_1$, $E_2$ may be located anywhere in the electrical system depending upon the type of dictation transmitting system used. For example, if a private line system is used, the contacts $C_1$, $C_2$ and $E_1$, $E_2$ may be located at the remote station and closed either automatically or manually when required. On the other hand, if a dial dictation trunk system of the Bell Telephone PBX system is used, the contacts $C_1$, $C_2$ and $E_1$, $E_2$ would be located in the PBX system and upon dialing the appropriate number or hang-up of the phone receiver the respective contacts would be closed as required.

In such systems there is a substantial power loss from the remote station to the central dictation recording machine and secondly, there is usually not enough power available at a remote station to operate solenoid 10. A supplementary power supply is therefore provided which consists of an alternating source of voltage across points 52 and 54. A low-voltage selenium bridge rectifier 56 is provided to convert the alternating current to a DC low-voltage output which for purposes herein, of of approximately 18 volts. A capacitor filter 58 is included to smooth out the DC supply of current to prevent hum in the audio output of the recording machine. The rectifier 56 provides the polarity as shown.

Upon closure of contacts $E_1$ and $E_2$ the anti-reverse solenoid 10 is energized by current flowing therethrough so that arm 14 is withdrawn to pivot plate 12 about pin 16 to disengage the worm gear engaging portion 36 and return the record medium index to its start position thereby closing switch $T_1$.

Independently of the anti-reverse solenoid, upon closure of contacts $C_1$, $C_2$, a positive pulse is applied to the backspace relay GR3 which closes contacts 9 and 4. The backspace relay is shown in its normally closed position. Upon closure of contacts 9 and 4, a ground is applied to a backspace solenoid (not shown) which is located in the central dictation machine to activate the backspace function of the machine and re-wind the record tape a predetermined increment of distance.

As discussed above, when anti-reverse solenoid 10 is activated by the closure of contacts $E_1$ and $E_2$, then switch $T_1$ is closed by the return of the record medium index to its start position. Referring to the circuitry of FIG. 4, upon closure of switch $T_1$, a positive pulse is applied to anti-reverse relay GR6 to open the contact of the anti-reverse relay. The anti-reverse relay is shown in its normally closed position. When the anti-reverse relay GR6 is in an open position, the closure of contacts $C_1$ and $C_2$ at the remote station will not apply a positive pulse to the backspace relay GR3 because the circuit is broken by opening of the anti-reverse relay contact. It is therefore apparent that while the switch $T_1$ remains closed, the backspace relay GR3 cannot be activated to close contacts 9 and 4.

The relays GR3 and GR6 may be of the 12 volt DC type which are well-known and adequate for the electrical circuitry shown. Such relays may be obtained from the manufacturer IT & T. The anti-reverse solenoid may be of the 24 DC magnitude such as that manufactured by Guardian Manufacturing Company of Chicago and sold under the trade mark "Guardian".

When the anti-reverse solenoid 10 is activated by the closure of contacts $E_1$ and $E_2$, the record medium index 26 returns to its start position independently of the position of the recording tape relative to the record playback head, i.e. the recording tape remains stationary relative to the record-playback head during such movement of the record medium index. During the dictation of a new message, the record medium index 26 moves along plate 12 as driven by worm gear 34. During such dictation, switch $T_1$ is open so that closure of contacts $C_1$ and $C_2$ results in a backspace of the recording tape relative to the record playback head a predetermined incremental distance. When dictation of the message is completed, upon hang-up of the telephone, contacts $E_1$ and $E_2$ may be automatically closed within the PBX system to antivate anti-reverse solenoid 10 which, as discussed, returns the record medium index 26 to its start position to close switch $T_1$. When the next person picks up the telephone at a remote station and wishes to record another message on the central dictation record-playback machine, the record medium index 26 is at its start position and prevents the person who is going to dictate the next message from backspacing into the previously recorded message because switch $T_1$ is closed. When the next person begins his dictation, the worm gear 34 which is connected to the drive which drives the recording tape relative to the record playback head moves the record medium index 26 along plate 12 from its start position. The resilient spring wires 48 and 50 of switch $T_1$ move with the index 26 along plate 12 from positions 48a and 50a to 48 and 50 a distance equivalent to a predetermined incremental distance which the tape is backspaced upon activation of the backspace function of the dictation machine. At this point, wires 48 and 50 disengage to open switch $T_1$ and permit activation of backspace relay GR3 by closure of contact $C_1$, $C_2$. Upon such backspace, it is noted however, that index 26 would be returned to its start position so that backspacing is only permitted to the beginning of the message which is presently being recorded. The anti-reverse means according to this invention prevents backspacing into a previously recorded message to either listen to such message or erase it upon subsequent dictation.

It is therefore apparent that the anti-reverse means according to this invention can be adapted for use on a central dictation record-playback machine for recording dictated messages transmitted from a remote station where the machine has a record medium index which is adapted to return to its start position while the position of the record-playback head remains stationary relative to the recording tape of the central dictation record-playback machine.

Although various preferred embodiments of the invention have been discussed herein in detail, it will be understood by those skilled in the art that variations may be made thereto without departing from the spirit of the invention or the scope of the appended claims.

I claim:

1. In a central dictation record-playback machine for recording dictated messages transmitted from a remote station, the central dictation record-playback machine having a record medium index which is adapted to return to its start position while the position of a record-playback head remains stationary relative to a recording tape of the central dictation record-playback machine when dictation of each message from a remote station is completed and having means for backspacing a recording tape relative to a record-playback head, an anti-reverse means for precluding backspacing into and playing back previously recorded messages on the central dictation record-playback machine comprising means for returning the record medium index to its start position upon command from a remote station when dictation of a message from a remote station is completed, a normally open contact which is closed when the record medium index is returned to its start position, said contact being so connected to the means for backspacing that activation of such means is precluded as long as said record medium index is in its start position, said means for backspacing being capable of activation upon command from a remote station when said contact is open, said record medium index being moved from its start position during subsequent dictation of a message from a remote station to the central dictation record-playback machine and with such movement said contact being opened so that backspacing into and playing back the message being presently recorded is permitted.

2. In a central dictation record-playback machine of claim 1 the record-playback head index moving along a scale simultaneously with the movement of the recording tape relative to the record playback head to indicate the position of the record-playback head relative to the recording tape.

3. In a central dictation record-playback machine of claim 2, each remote station being provided with means for activating said means for returning the record medium index to its start position when dictation of a message from a remote station is completed.

4. In a central dictation record-playback machine of claim 1, the record medium index moving along a scale simultaneously with the transverse movement of the recording tape relative to the record-playback head of the central dictation record-playback machine, said means for returning the record medium index including a coiled spring attached to the record medium index, and a worm gear which releasably engages the record medium index to move the record medium index along a scale to indicate the position of the recording tape relative to the record-playback head of the central dictation record-playback machine, said coiled spring being adapted to return the record medium index to its start position on the scale when the record medium index is disengaged from said worm gear.

5. In a central dictation record-playback machine of claim 4, the record medium index being slidably mounted on an elongate plate and moving along the length of said plate as it is driven by said worm gear, said plate being pivotally mounted to pivot about its longitudinal axis, the record medium index having a worm gear engaging portion located to one side of the plate, the arrangement being such that said worm gear engaging portion of the record medium index disengages from said worm gear when said plate is pivoted about its longitudinal axis to move the worm gear engaging portion away from the worm gear, said means for returning the record medium index further including means for pivoting said plate in a direction which moves said worm gear engaging portion away from said worm gear wherein said means for pivoting said plate is activated when dictation of a message from a remote station is completed.

6. In a central dictation record-playback machine of claim 5, said means for pivoting said plate comprises a solenoid which is momentarily automatically activated by means provided at a remote station when dictation of a message from such remote station is completed, said solenoid having a movable arm so connected to said plate to pivot said plate about its longitudinal axis that said worm gear engaging portion is moved away from said worm gear when said solenoid is activated, said plate having a spring connected thereto to return the plate to its normal position when said solenoid is deactivated.

7. In a central dictation record-playback machine of claim 4, said contact comprising a normally open switch being positioned on said plate at the start position of the record medium index where the record medium index contacts said switch to close same when it is at its start position, a normally closed relay contact which while closed permits activation of the means for backspacing and which when opened precludes such activation, the arrangement being such that said relay remains closed while said switch is open and conversely said relay remains open while said switch is closed.

8. In a central dictation record-playback machine of claim 6, the means for backspacing being adapted to backspace the recording tape relative to the record playback head a predetermined incremental distance, said switch comprising two resilient wires which are adapted to contact each other and constitute a closed switch when the record medium index returns to its start position the record medium index displacing both resilient wires upon return to its start position while they are in contact with each other, both of said resilient wires remaining in contact with each other and moving with the record medium index after it leaves its start position when a new message is being dictated from a remote station a distance equivalent to the predetermined increment of backspacing distance of the means for backspacing at which point said two resilient wires disengage to constitute an open switch thereby permitting activation of the means for backspacing so that backspacing is only permitted back to the beginning of the message being presently recorded.

9. An anti-reverse means for a central dictation record-playback machine comprising an anti-reverse solenoid, a normally open switch, means for activating said anti-reverse solenoid and means connected to said switch which precludes backspacing of a recording tape relative to a record-playback head of a central dictation record-playback machine when said switch is closed, said anti-reverse solenoid having a movable arm which is connected to a plate on which a record medium index is slidably mounted and driven along such plate by a worm gear, the plate being adapted to pivot about its longitudinal axis to disengage the record medium index from the worm gear and upon such disengagement, the record medium index is returned to its start position on the plate, said switch being closed when the record medium index returns to its start position whereby backspacing into a previously recorded message on a central dictation record-playback machine is precluded.

10. An anti-reverse means of claim 9 wherein said switch comprises two resilient wires which are adapted to contact each other and constitute a closed switch when the record medium index returns to its start position, the record medium index displacing both resilient wires upon return to its start position while they are in contact with each other, both of said resilient wires remaining in contact with each other and moving with the record medium index after it leaves its start position when a new message is being recorded a distance equivalent to a predetermined increment of backspacing distance at which point said two resilient wires disengage to constitute an open switch, thereby permitting backspacing back to the beginning of the message being presently recorded.

* * * * *